Dec. 15, 1970  R. D. PRESTON  3,546,802
PICTURE FRAMES
Filed July 18, 1968  3 Sheets-Sheet 1

United States Patent Office 3,546,802
Patented Dec. 15, 1970

3,546,802
PICTURE FRAMES
Raymond David Preston, 2 Purfield Drive, Wargrave-on-Thames, Berkshire, England
Filed July 18, 1968, Ser. No. 745,897
Int. Cl. G09f 1/12
U.S. Cl. 40—152    17 Claims

ABSTRACT OF THE DISCLOSURE

A readily demountable picture frame comprising a block of high density expanded plastics material with a shallow recess in one of its major faces for the reception of a planar member or members, such as a picture or the like and glass cover sheet therefor, the frame further comprising an edge surround formed from a material more rigid than the block and so dimensioned as to be engageable with the edges of the said block as a firm push-fit and to overlap parts of the recess thereby to retain a said member or members within the recess.

---

Figure 1:
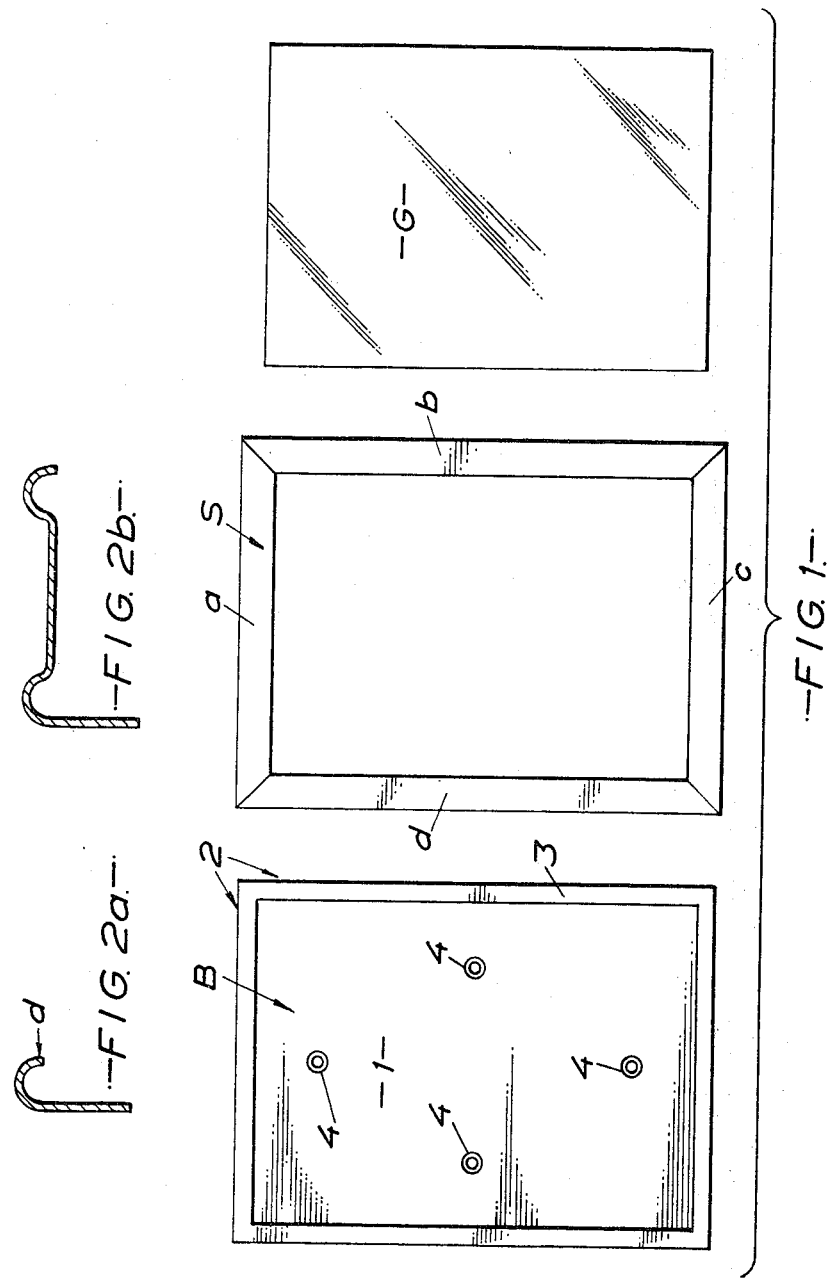

The present invention relates to frames which are intended primarily for use as picture frames but which may, of course, be used for other related purposes. For this reason the term "picture frame" as used herein should not be regarded as limiting the scope of the invention only to a frame for framing pictures. Furthermore, the term "picture" as used herein should be interpreted as including, not only paintings and printed reproductions thereof, but also photographs, greetings and displays of all types.

It is a well known fact that it is undesirable for a retailer or art gallery to hold similarly large stocks of prints and frames, the price of frames being in general far in excess of the price of prints. It is of course ideal for such a retailer to be able to hold a stock of prints which is large with respect to his stock of frames and for a print selected by a purchaser to be readily assembled in a stock frame. Such an ideal situation does not, however, generally exist because the mounting of a print in a frame must generally be referred to an expert unless a ready-made frame of exactly the required size and design is on hand. For such an exactly suitable frame to be readily at hand it follows, of course, that the retailer stocking a large number of prints must have in stock the aforementioned undesirably large range of frames.

It is an object of the present invention to provide a frame which is readily assembled and disassembled for the purpose of locating therein a selected picture or the like.

It is a further object of the invention to provide a frame which can, if necessary, be assembled by a customer who has bought, or is in possession of, a picture or the like which he wishes to frame. It is a still further object to enable either a retailer or customer to be able to mount a picture in a frame and achieve an attractive end result with the minimum of skill.

It is another object of the invention to provide a frame which affords an unusual degree of protection to a picture and covering glass or the like contained therein.

It is yet another object of the invention to provide a frame which, because of its readily demountable nature, can be modified to suit the particular requirements of a user.

According to these and other objects, the invention consists in a readily demountable picture frame comprising a block of high density expanded plastics material with a shallow recess in one of its major faces for the reception of a planar member or members, such as a picture or the like and glass cover sheet therefor, the frame further comprising an edge surround formed from a material more rigid than the block and so dimensioned as to be engageable with the edges of the said block as a firm push-fit and to overlap parts of the recess thereby to retain a said member or members within the recess.

Advantageously the block is of polystyrene or polyurethane and the edge surround of plastics, wood or an alloy.

Preferably the edge surround is predominantly L-shaped in cross-section.

Figure 2:
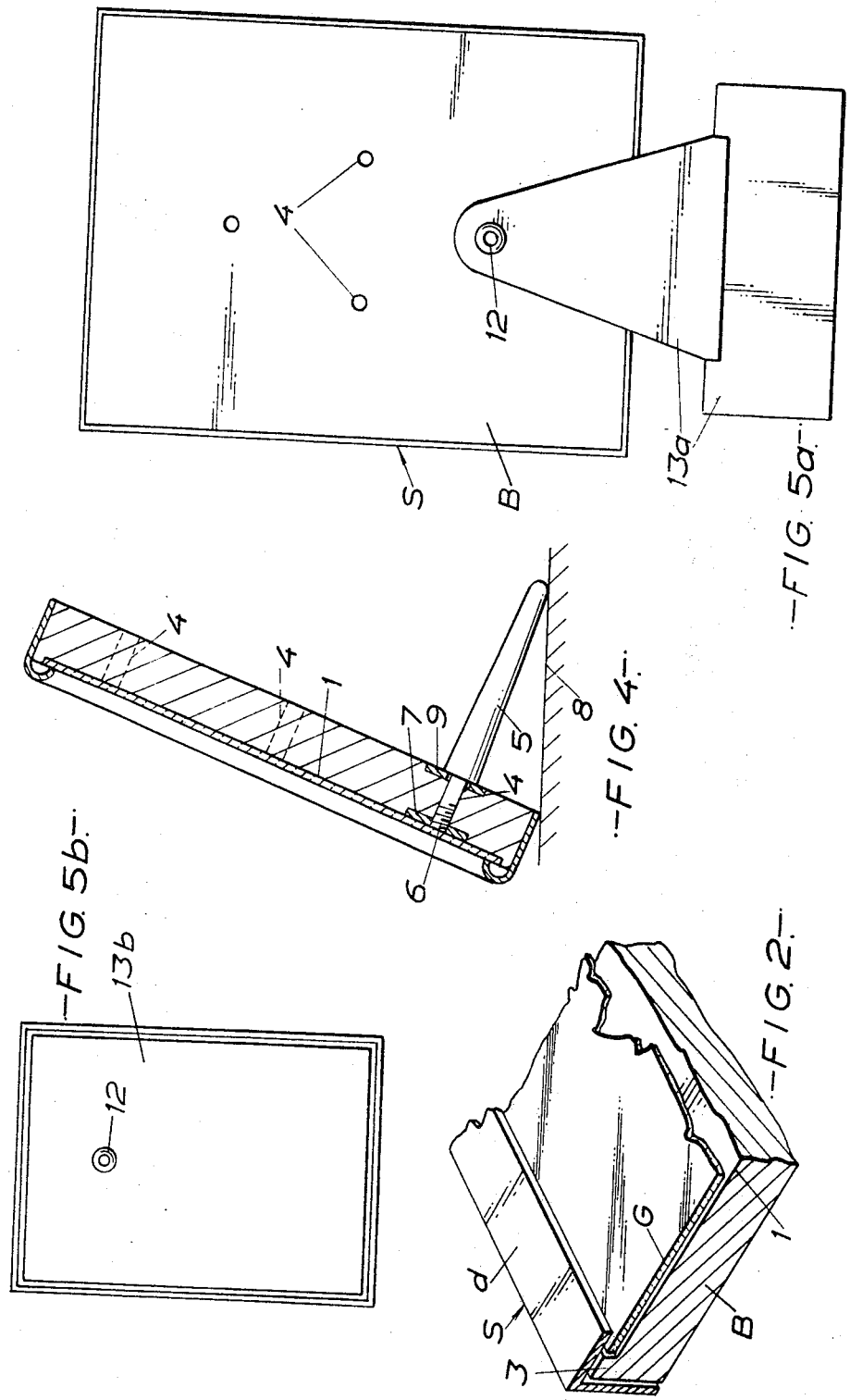
Figure 3:
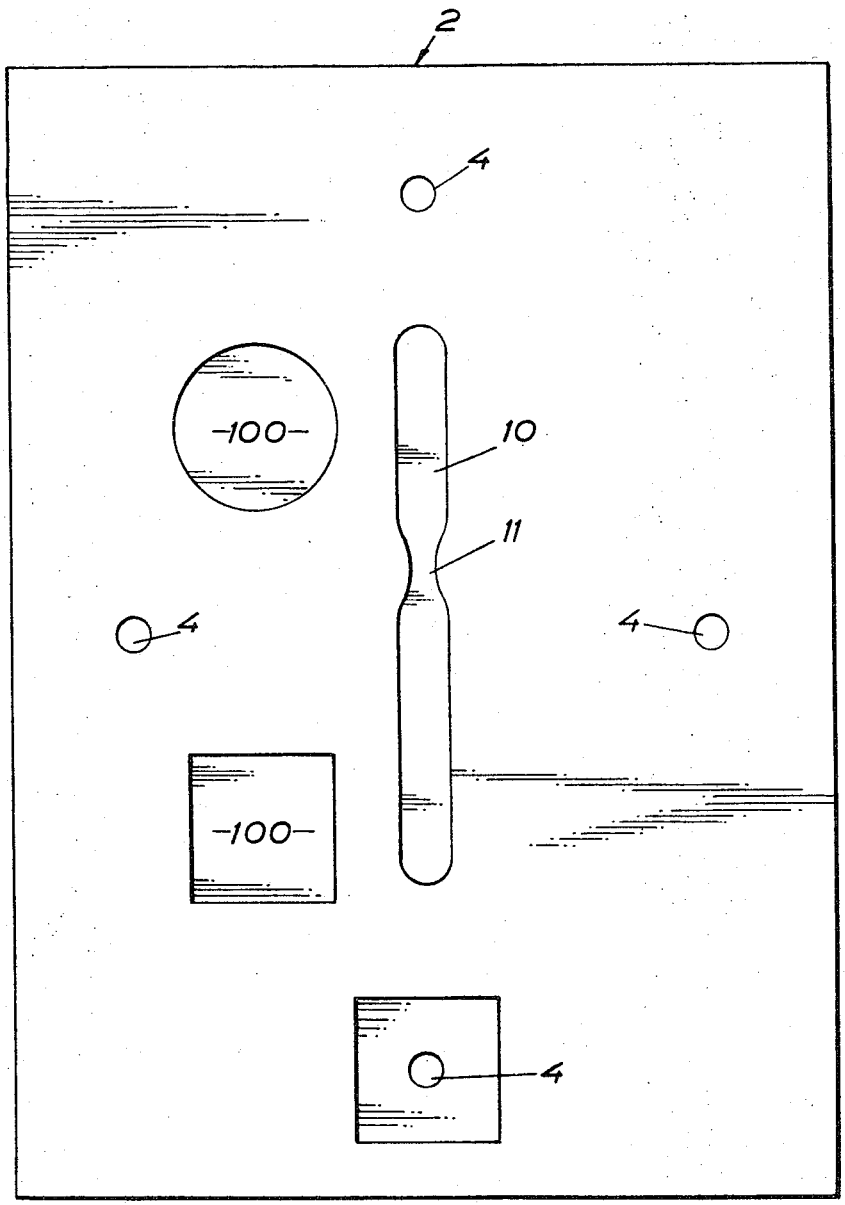

These and other objects and advantages of the invention will be clear from the following description, given with reference to the accompanying drawings which are by way of example and in which:

FIG. 1 is a plan view of one embodiment of a frame according to the invention in exploded or demounted form, FIG. 2 is partly perspective, partly sectioned, view of the frame of FIG. 1 when assembled for use, FIGS. 2a and 2b are detailed views of possible modifications of the frame of FIGS. 1 and 2, FIG. 3 is a plan view of the rear of the frame, FIG. 4 is a side sectional view of the frame showing supporting means therefor, and FIGS. 5a and 5b exemplify possible further uses for a frame according to the invention, the frame in both cases being shown in rear plan view.

From FIG. 1 it will be seen that a frame according to the invention comprises three basic parts, one of which is optional. Thus the frame essentially comprises a rectangular block B of expanded plastics, e.g. polystyrene or polyurethane, material of relatively high density which exhibits good shape recovery properties. As shown the block B has a rectangular recess 1 formed in its upper major surface, the said recess 1 being spaced from the peripheral edge 2 of the block B by a peripheral ridge 3 of thickness in the order of a few tenths of an inch. As is also shown, the block is perforated at 4, and in the illustrated embodiment four such perforations are provided, although this number is given purely by way of example. The perforations may extend through the recess 1 to the rear face as shown or may be blanked off at a suitable depth (not shown).

The second essential component of the frame according to the invention is an edge surround S which is formed as a single integrated whole from four component edge pieces, a, b, c and d with pseudo-mitred joints at their ends. The nature of the edge pieces is best seen from FIGS. 2, 2a and 2b, which latter two figures show possible alternative edge piece forms in section.

Thus, as will be seen from FIGS. 2, 2a and 2b the edge pieces a, b, c and d are each predominantly L-shaped in section although, as instanced in the said FIGS. 2a and 2b they may be embellished in any suitable manner, e.g. with decorative curves and with planar extensions to form wide picture surrounds.

In practice the edge surround S may be formed from virtually any suitable material which is less easily deformable than the block B and it may be formed in virtually any suitable manner. Advantageously, the said surround S if formed by moulding or extrusion as a single integrated plastics unit but may alternatively be moulded or otherwise constructed from aluminum or any like alloy. If desired it may be formed by the mitring together of four separate edge pieces in accordance with known techniques.

The surround must in any case be self-supporting and although it may exhibit some resilience it should be sufficiently rigid to provide good frictional engagement with the block B over which it is engageable as a push-fit, the push-fit being between the block sides and the edge piece legs.

The third and optional component of the frame is a rectangular sheet of glass G which is so dimensioned as to fit squarely and possibly also as a push-fit in the recess 1 of block B.

The dimensions of the glass sheet G, the edge surround S, the block B and the recess 1 in the block B are also such that the frame may be assembled as a well-fitting whole as shown in FIG. 2—in which figure enlarged gaps are shown in the interests of clarity—by insertion first of the glass G in the recess 1 with a picture, postcard, photograph or the like sandwiched between the glass and recess bottom. The edge surround S is then located as a push-fit over the block B and sheet G as also shown in FIG. 2 thereby to maintain the aggregation in their desired mutual relationship. Where desired the glass sheet may be omitted.

It should be noted that the block B is preferably formed from expanded polystyrene or polyurethane of relatively high density because these materials exhibit peculiar properties in compression and suitable coefficients of friction. Thus it is found that, when expanded material of the type referred to is compressed, it exhibits a degree of compression and then slowly returns to its original dimensions. As a result of this, and of the high coefficient of friction which it offers, the push-fit between the edge surround S and block B provides mutual retentive engagement and a satisfying firm fit. Also, when the glass sheet G is pushed into the recess 1, the ridge 3 defining the recess may "give" sufficiently to allow a satisfying, smooth and firm interengagement of the two components.

As previously indicated the edge surround S may exhibit some degree of resilience because such a state of affairs may provide for increased frictional grip between the components of the frame, although often the major grip occurs between the corners of the block and frame.

The previously detailed properties of the expanded materials used also allow the frame to be readily mounted on a wall or the like. Thus, if a nail or screw is driven into a vertical wall with the sharply edged head thereof left outstanding, and a perforation 4 of the block B slipped over the head, it is found that the frame weight will cause the said head to cut into the block B by virtue of the low resistance which such materials offer to point load. The erected frame will thus be not only vertically supported but also afforded a degree of resistance against displacement away from the wall.

As an alternative method of hanging, rivets dimensioned to be a push-fit in the perforations 4 may be used to anchor a picture cord of conventional type. Where it is required to have the frame free-standing on a horizontal or similar surface a spigot or rod of rigid plastics or metal is utilised, as shown in FIG. 4. In the said FIG. 4 such a rod 5, which is threaded at one of its ends 6 is pushed through a perforation 4 from the rear of the block B. As indicated in FIG. 4 there is sunk into the base of the recess 1 a square metal plate 7 which is threaded to engage the thread of the spigot 5. The hole into which the square plate 7 is sunk is square so that the latter is prevented from turning when the spigot 5 is screwed thereto, the fact that the plate is so sunk into the base of recess 1 ensuring that there is no interference therefrom with a picture or the like located in the said recess.

The frame is supported on a horizontal surface 8 as shown in FIG. 4 the spigot or easel 5 functioning as a prop at the rear of the frame. In order that the spigot 5 may not distort or cut the block around the perforation 4, a washer 9, is sunk into a round or square recess at the rear of the block B thereby to spread the resultant load.

For the purpose of component storage, the rear of the block B may conveniently be recessed as shown in FIG. 3. Thus to receive the spigot 5. Here is provided a recess 10 with a nip 11 which serves to grip the spigot when laid in the recess. Other suitably shaped recesses, of which two are exemplified at 100 receive the washers for storage.

In accordance with a further feature of the invention there is provided a rivet 12 (FIG. 5a), which is, when not in use, stored in any of the perforations 4 at the rear of the frame. The said rivet is a push-fit in any of the perforations 4 and may be utilised for removably securing a card, calendar, greetings legend or the like 13a to the frame. In this way it is possible to produce, from a relatively limited selection, a relatively wide range of combinations of legends frames. It is also possible to swivel such a legend or the like 13a up round the rivet axis and into a storage or transit position behind the frame.

In the alternative embodiment shown in FIG. 5b, a card 13b or the like may be secured by a pivot into the top perforation 4, the card being suitably dimensioned so that a user can pull the lower edge thereof out so that the frame can be displayed free-standing on a table or desk top.

From the aforegoing description various important features and advantages of the invention will have become evident. Firstly it will be evident that a frame according to the invention offers a very good weight/strength ratio and thus incurs low transit charges. Further, it should be noted that expanded polystyrene or polyurethane provides an ideal packing material for fragile materials such as glass and thus a frame constructed in accordance with the invention offers a high degree of protection for any glass utilised therein.

As previously indicated the use of glass is optional but is frequently preferred.

As the block B is the only stress-bearing element of the total assembly and the edge surround S is decorative and protective but functions mechanically only to retain the glass, picture or the like in the recess of the block B, the said surround need not exhibit considerable mechanical strength.

As a further possible use to which the invention may be put it is suggested that a series of blanks be stored in the recess 1 and a series of pencils or the like stored in recesses formed in the rear of the frame block. Such an arrangement is ideally suited to a frame which provides for the well known "painting by numbers" games for children.

I claim:
1. A readily demountable picture frame, comprising a block of high density expanded plastics material with a shallow recess in one of its major faces for the reception of a planar member or members, and a unitary edge surround formed from a material more rigid than the block and so dimensioned as to surround and be frictionally engageable with the outer edges of the said block in a firm but releasable push-fit and to overlap parts of said recess, thereby to retain a said member or members within said recess.

2. A frame as claimed in claim 1 wherein the block material is polystyrene.

3. A frame as claimed in claim 1, wherein the block material is polyurethane.

4. A frame as claimed in claim 1, wherein the edge surround is formed from plastic material.

5. A frame as claimed in claim 1, wherein the edge surround is formed from an aluminium.

6. A frame as claimed in claim 1, wherein the edge surround is formed from an alloy.

7. A frame as claimed in claim 1, wherein the edge surround is formed from wood.

8. A frame as claimed in claim 1, wherein the edge surround is formed from four separate edge pieces mitred together.

9. A frame as claimed in claim 1, wherein the edge surround is formed as an integrated whole.

10. A frame as claimed in claim 1, wherein the frame block and edge surround are rectangular in plan.

11. A frame as claimed in claim 1, wherein the edge surround is predominantly L-shaped in cross-section.

12. A frame as claimed in claim 11, wherein the L-shaped cross section is embellished by the provision of a curve in said surround.

13. A frame as claimed in claim 11 wherein a portion of the surround is extended a substantial distance over said recess to provide an enlarged surround for a member or members in said recess.

14. A frame as claimed in claim 1, wherein the block is recessed at its rear major face to store members such as supporting means for the frame.

15. A frame as claimed in claim 1, wherein the block is perforated to receive fixing means or supporting means.

16. A frame as claimed in claim 15, wherein said supporting means comprise two washers and an easel threaded at one end, one said washer being perforated and threaded to engage said easel and the other being perforated to allow the free passage therethrough of said easel, the said washers being anchored in recesses formed in the block major faces surrounding a perforation therethrough into which said threaded easel end extends.

17. A frame as claimed in claim 1, wherein the shallow recess is so dimensioned as to receive a member such as a glass sheet.

References Cited

UNITED STATES PATENTS

| | | | |
|---|---|---|---|
| 785,534 | 3/1905 | Anderson | 40—154 |
| 2,296,596 | 9/1942 | Brown | 40—154 |
| 2,521,558 | 9/1950 | Alvarez | 40—154X |
| 2,548,151 | 4/1951 | Friedman | 40—156X |
| 2,614,354 | 10/1952 | Winslow | 40—156 |
| 2,777,232 | 1/1957 | Kulicke et al. | 40—155 |
| 3,186,118 | 6/1965 | Smith | 40—154 |
| 3,425,147 | 2/1969 | Marx | 40—155 |

JEROME SCHNALL, Primary Examiner

W. J. CONTRERAS, Assistant Examiner

U.S. Cl. X.R.

40—154